SAWTOOTH WAVE VOLTAGE GENERATOR

Filed July 25, 1946

INVENTOR
KURT SCHLESINGER
BY H. S. Grover
ATTORNEY

Patented Oct. 28, 1952 2,616,044

UNITED STATES PATENT OFFICE 2,616,044

SAWTOOTH WAVE VOLTAGE GENERATOR

Kurt Schlesinger, New York, N. Y., assignor to Radio Corporation of America, a corporation of Delaware Application July 25, 1946, Serial No. 686,167

1 Claim. (Cl. 250—27)

This invention relates to sawtooth wave voltage generators and more particularly to methods and means for deriving a sawtooth wave voltage from a sine wave voltage.

One of the most common wave shapes for signals of varying amplitude is a sine wave. The variations in the emf produced in the simple mechanical generator throughout one cycle can be represented by a sine wave.

Electrical oscillating circuits also provide sine wave voltages. A sine wave generator has many applications and can be designed to fulfill many requirements. Sine wave voltage generators adapt themselves to systems wherein there is a requirement for variable frequencies.

Pure sinusoidal waves are basic wave shapes and any periodic wave or one that repeats itself in definite time intervals is composed of sine waves of different frequencies and amplitude added together. The sine wave which has the same frequency as the complex periodic wave is called the fundamental. The frequencies higher than the fundamental are called harmonics, which are always a whole number of times higher than the fundamental and are designated by this number.

Sawtooth wave voltages have many applications and such applications very often are associated in electrical circuits having at some point sine wave voltages to which it is desired to associate the sawtooth wave voltage. It often becomes desirable to generate sawtooth wave voltages having a frequency which is dependent upon a sine wave voltage frequency.

A sawtooth wave is made up of different sine waves. A second harmonic of smaller amplitude is added to the fundamental. When a second harmonic is added to a fundamental, the crest of the resultant appears to be pushed to one side. When a third harmonic is added, the crest appears to be pushed further to the side. This process is carried on by adding the fourth, fifth, sixth, and seventh harmonics, and with each harmonic added the resultant more nearly resembles a sawtooth wave.

It will be seen that by properly distorting a sine wave voltage, a sawtooth wave voltage may be produced.

According to this invention, a sawtooth wave voltage is produced from a full wave rectified parabolic wave which is derived from a sine wave voltage.

The primary object of this invention is to provide an improved method and means for generating sawtooth wave voltages.

Another object of this invention is to provide a circuit for generating sawtooth wave voltages having a variable frequency.

Still another object of this invention is to derive a sawtooth wave voltage from a sine wave voltage.

A further object of this invention is to provide a circuit to generate sawtooth wave voltages of a frequency controlled by the frequency of a sine wave voltage.

Figure 1:
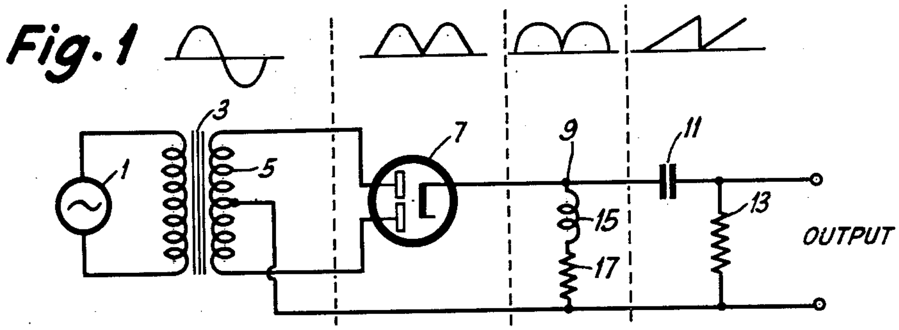
Figure 2A:
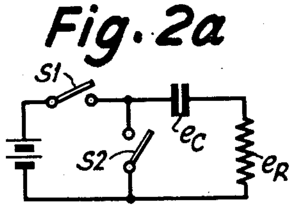
Figure 2B:
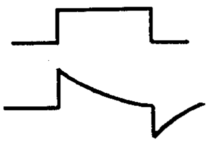
Figure 2C:
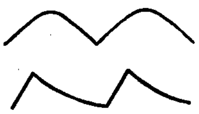
Figure 2D:
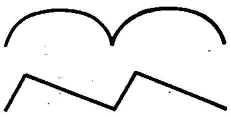
Figure 3:
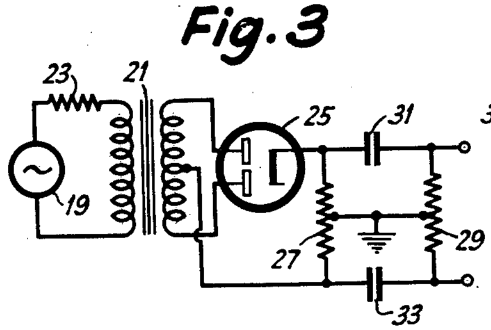
Figure 4:
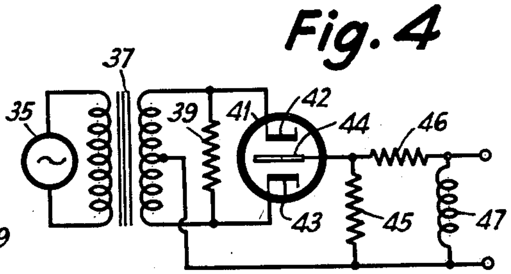
Figure 5:
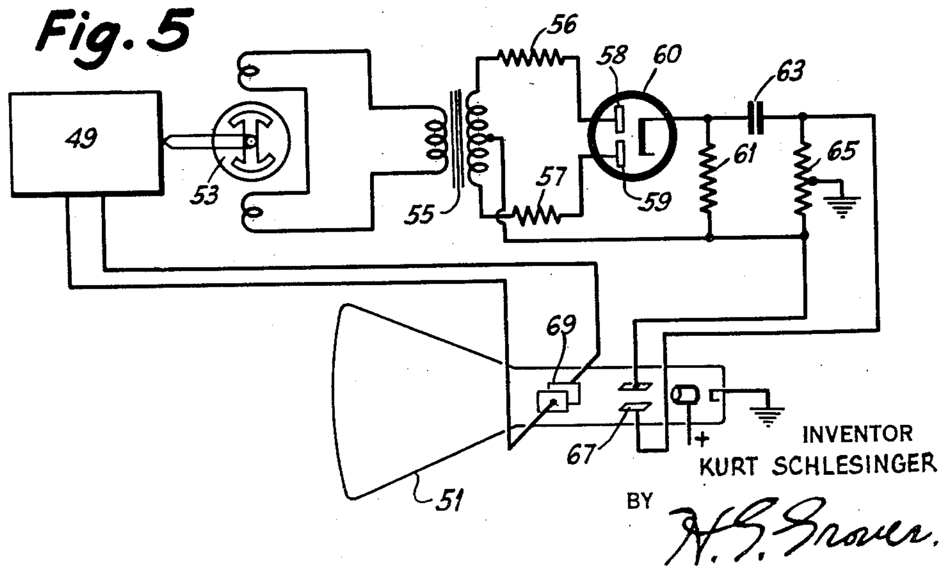

Other and incidental objects of the invention will be apparent to those skilled in the art from a reading of the following specification and an inspection of the accompanying drawing in which Figure 1 shows schematically a preferred form of this invention, Figures 2*a*, 2*b*, 2*c* and 2*d* illustrate graphically the operation of this invention, Figure 3 shows schematically another form of this invention, Figure 4 shows still another form of this invention, Figure 5 illustrates one application of this invention.

Referring now in more detail to Figure 1, there is shown a sine wave generator 1 which may take the form of any of the sine wave generators well known in the art.

A transformer 3 is connected to the source of sine waves 1. Transformer 3 has a center tapped secondary 5. A rectifier 7 is connected to transformer secondary 5 in such a manner that a full wave rectified voltage is provided in the output of the rectifier at point 9.

A differentiating circuit comprising a condenser 11 and a resistor 13 is connected to point 9 to change the voltage at point 9 to a sawtooth wave voltage.

A resistance capacity voltage divider that is designed to distort the input voltage wave shape is known as a differentiator or an integrator, depending upon the location of the output taps. The output from a differentiator is taken across the resistance while the output from an integrator is taken across the capacitor. Such circuits will change the shape of any complex alternating voltage wave shape that is impressed on them, and this distortion is a function of the value of the time constant of the circuit, as compared to the period of the wave shape.

The detailed operation of a differentiator can best be explained by reference to Kirchoff's and Ohm's laws for voltage dividers.

Ohm's law for alternating or direct current states that the voltage across a resistance equals the current through it times the value of the resistance. This means that a voltage will be developed across a resistance only when current flows through it.

A capacitor is capable of storing or holding a charge of electrons. When uncharged, both plates contain the same number of free electrons. When charged, one plate contains more free electrons than the other. The difference in the number of electrons is a measure of the charge on the capacitor. The accumulation of this charge builds up a voltage across the terminals of the capacitor, and the charge continues to increase until this voltage equals the applied voltage. The charge in a capacitor is computed by the formula $Q=CE$. In this formula, Q is the charge in coulombs (1 coulomb is the quantity of electricity transferred if 1 ampere flows for 1 second), C is the capacity in farads, and E is the voltage in volts. Thus, the greater the voltage, the greater the charge on a capacitor. Unless a discharge path is provided, a perfect capacitor keeps its charge indefinitely, even if the source of voltage has been removed. Any practical capacitor, however, has some leakage through the dielectric so that the charge will gradually leak off.

A voltage divider may be constructed as shown in Figure 2*a*. Kirchoff's and Ohm's laws hold for such a divider. This circuit is commonly known as an R–C circuit and its behavior is discussed below.

In Figure 2*a*, an R–C circuit is shown connected to a D. C. voltage source and two switches. If $S_1$ is closed, electrons are attracted from the upper plate of the capacitor. This flow of electrons is the current which charges capacitor C. At the instant current begins to flow, there is no voltage on the capacitor; therefore, the voltage E across the divider must appear as the voltage drop across the resistor. The inital current, then, must be equal to $E/R$. Figure 2*b* shows that at the instant the switch is closed, the entire input voltage E appears across R and that the voltage across C is zero.

The current flowing in the circuit soon charges the capacitor a small amount. Since the voltage on the capacitor is proportional to the charge on it, a small voltage will appear across the capacitor. This small voltage is opposite in polarity to, and will subtract from, the battery voltage. Since R is fixed, the charging current must decrease and the capacitor will charge more slowly.

The charging process continues until the capacitor is fully charged and the voltage across it is the battery voltage. At that time, the voltage across R must be zero and no current will flow. Theoretically, the capacitor is never fully charged, and some voltage will always appear across the resistor. However, if $S_1$ is closed a long enough time, the steady state condition is reached for all practical purposes.

If C is fully charged and $S_1$ is opened, the condenser voltage $e_c$ will be maintained at the battery voltage if C is a perfect capacitor. If $S_2$ is then closed, a discharge current will flow and start to discharge the capacitor. Since the discharge current is opposite in direction to the charging current, the voltage developed across the resistor will be opposite in polarity to the charging voltage, but it will have the same magnitude and vary the same way. The voltage across the capacitor and the voltage drop of the resistor must add to equal zero during the discharge.

An examination of the sawtooth wave shown in Figure 2*b* resulting from the application of a square wave to a differentiator shows its nonlinearity resulting from the universal time constant curve for an R–C circuit. It can be seen, however, that by properly shaping the voltage wave applied to the differentiator circuit, a linear sawtooth wave will result.

Neither a differentiator nor an integrator can change the shape of a pure sine wave. If a pure sine wave voltage is applied to a resistance capacity voltage divider, the sine wave will be shifted in phase. However, if a full wave rectified sine wave voltage is applied to the differentiator circuit, the output voltage of the differentiator will take the form of a non-linear sawtooth wave voltage, as shown in Figure 2*c*.

By still further modifying the input signal to the differentiator circuit, a linear sawtooth wave, such as shown in Figure 2*d*, results.

It will be found that the signal applied to the differentiator circuit to produce the linear sawtooth wave shown in Figure 2*d* will take the form of a full wave rectified parabolic wave.

It therefore follows that if the sine wave input to the differentiator is distorted to form a parabolic wave, a linear sawtooth wave will result.

Sine waves are approximately parabolic and may be transformed into parabolas in several manners.

Returning to Figure 1, there is inserted across the output of the rectifier 7 a series circuit including inductance 15 and a resistance 17. By the proper selection of the component elements 15 and 17, a rectified parabolic wave will result. A sawtooth wave will then be produced in the output circuit of the differentiator.

Turning now to Figure 3, there is shown another form of this invention wherein a sine wave generator 19 is connected to transformer 21 through a series resistance 23. Resistance 23 is inserted in the primary circuit of transformer 21 to distort the sine wave voltage generated by generator 19 to provide a parabolic wave. The distorted sine wave voltage is applied to rectifier 25, across whose output is connected a center tapped resistance 27. By providing a center tapped resistance 27 and a center tapped resistance 29, which is part of a differentiator circuit including condensers 31 and 33, a push-pull output voltage having a linear sawtooth wave form is produced.

There is shown in Figure 4 still another form of this invention wherein the pure sine wave voltage is distorted in another way to form a parabolic wave voltage. The sine wave voltage generator 35 is connected to transformer 37. A resistance element 39 is connected in parallel with the secondary of transformer 37. Resistance 39 loads transformer 37 such that the voltage applied to rectifier 41 takes the form of a parabolic wave. While resistance 39 is fully satisfactory, it may, where desired, be replaced by two series resistors connected to the cathodes 42 and 43 of tube 41 and to the input transformer terminals. This arrangement will have certain advantages, particularly from the power source standpoint, while still serving to attenuate the input wave and flatten it so that the parabolic wave will result.

It is often necessary to have a sawtooth wave voltage whose long slope consists of a gradual increase in amplitude as distinguished from the sawtooth wave having a gradual decrease in amplitude, as produced by the circuits shown in Figure 1 and Figure 3. This may be accomplished by the use of a rectifier 41 having two cathodes 42 and 43 and a single anode 44. The cathodes are connected to the transformer 37. The anode 44 is connected to the load resistor 45.

The rectifier 41 is loaded by resistor 45.

Another form of differentiator circuit is illustrated in Figure 4 and comprises resistor 46 and inductance 47.

An important technical application of this invention is shown in Figure 5. A motor 49 may be investigated at a remote point by oscilloscope 51. An electrical tachometer 53 provides a sine wave voltage to the primary of transformer 55. A pair of resistances 56 and 57 are inserted in series with the secondary of transformer 55 and the anodes 58 and 59 of tube 60 to distort the sine wave voltage generated by the tachometer 53 in order that a parabolic wave will be applied to rectifier 60. There will result a rectified parabolic wave across resistor 61. This rectified parabolic wave will be applied to the differentiator circuit including capacity 63 and center tapped resistance 65. Resistance 65 is center tapped in order that a push-pull sawtooth wave voltage will be applied to one set of deflecting plates 67 of the oscilloscope 51. Another voltage from the motor 49 may be applied to the set of deflecting plates 69 so that the desired test can be made upon the motor 49.

Having thus described my invention, what is claimed is:

A system for producing sawtooth voltage variations comprising an input transformer having a center tapped secondary winding, a full wave rectifier including a cathode and a pair of anodes, means for connecting the anodes to opposite ends of said secondary winding, a load element connected between said cathode and said center tap on the secondary winding, said load element having inductance and resistance connected serially, a differentiating network including a series connected condenser and resistance, means for connecitng said differentiating network in parallel with at least a portion of said load element, a pair of output terminals connected across the resistance element of said differentiating network, means to apply voltage variations of substantially sinusoidal wave form to the anodes of said full wave rectifier whereby voltage variations of parabolic wave form are present across said differentiating network, so that voltage variations of substantially sawtooth wave form are available at said output terminals.

KURT SCHLESINGER.

REFERENCES CITED

The following references are of record in the file of this patent:

UNITED STATES PATENTS

| Number | Name | Date |
|---|---|---|
| 1,960,614 | Anderson | May 29, 1934 |
| 2,078,644 | Swedlund | Apr. 27, 1937 |
| 2,146,769 | Schriever et al. | Feb. 14, 1939 |
| 2,205,760 | Fewings | June 25, 1940 |
| 2,243,234 | Von Duhn | May 27, 1941 |
| 2,296,393 | Martinelli | Sept. 22, 1942 |
| 2,408,078 | Labin et al. | Sept. 24, 1946 |
| 2,498,900 | Schoenfeld | Feb. 28, 1950 |